United States Patent [19]

Aigner et al.

[11] Patent Number: 5,844,933
[45] Date of Patent: Dec. 1, 1998

[54] ELECTRODE ARRANGEMENT FOR DIRECT CURRENT AND FURNACE

[75] Inventors: Bernhard Aigner, Oftering; Harald Berger; Peter Mittag, both of Linz, all of Austria

[73] Assignee: Voest-Alpine Industrien-lagenbau GmbH, Linz, Austria

[21] Appl. No.: 849,609

[22] PCT Filed: Nov. 30, 1995

[86] PCT No.: PCT/AT95/00236

§ 371 Date: Jun. 2, 1997

§ 102(e) Date: Jun. 2, 1997

[87] PCT Pub. No.: WO96/17091

PCT Pub. Date: Jun. 6, 1996

[30] Foreign Application Priority Data

Dec. 2, 1994 [AT] Austria .................................... 2248/94

[51] Int. Cl.⁶ .................................................... H05B 7/11
[52] U.S. Cl. .......................................... 373/103; 373/108
[58] Field of Search .................................... 373/102, 103, 373/104, 108

[56] References Cited

U.S. PATENT DOCUMENTS 3,949,151  4/1976  Kerton ..................................... 373/108
5,204,873  4/1993  Hiroshi .................................... 378/108
5,590,152  12/1996  Nakajima et al. ....................... 373/103

FOREIGN PATENT DOCUMENTS 0023058  1/1981  European Pat. Off. .

OTHER PUBLICATIONS

Stahl und Eisen, vol. 114, No. 5, 16 May 1994 pp. 37–41, 133, XP 000448184.

Kohle S 'Gegenuberstellung von Gleichstrom– und Drehstrom– Lichtbogenofen Comparison of Direct–Current and Three–Phase A.C. Arc Furnaces'.

Primary Examiner—Tu B. Hoang
Attorney, Agent, or Firm—Ostrolenk, Faber, Gerb & Soffen, LLP

[57] ABSTRACT

A d.c. arc furnace for metallurgical purposes includes two or more electrodes arranged on the furnace vessel and projecting into the furnace vessel. To avoid actions of forces departing from the magnetic fields derived form the currents conducted to the electrodes and effecting deflections of the electric arcs, the electric supply means provided for each of the electrodes are each arranged in the immediate vicinity of the electrode to be supplied, the electric supply means of one electrode being arranged so as to be spacially separated from the electric supply means of the remaining electrodes, viewed in the peripheral direction of the furnace vessel.

10 Claims, 1 Drawing Sheet

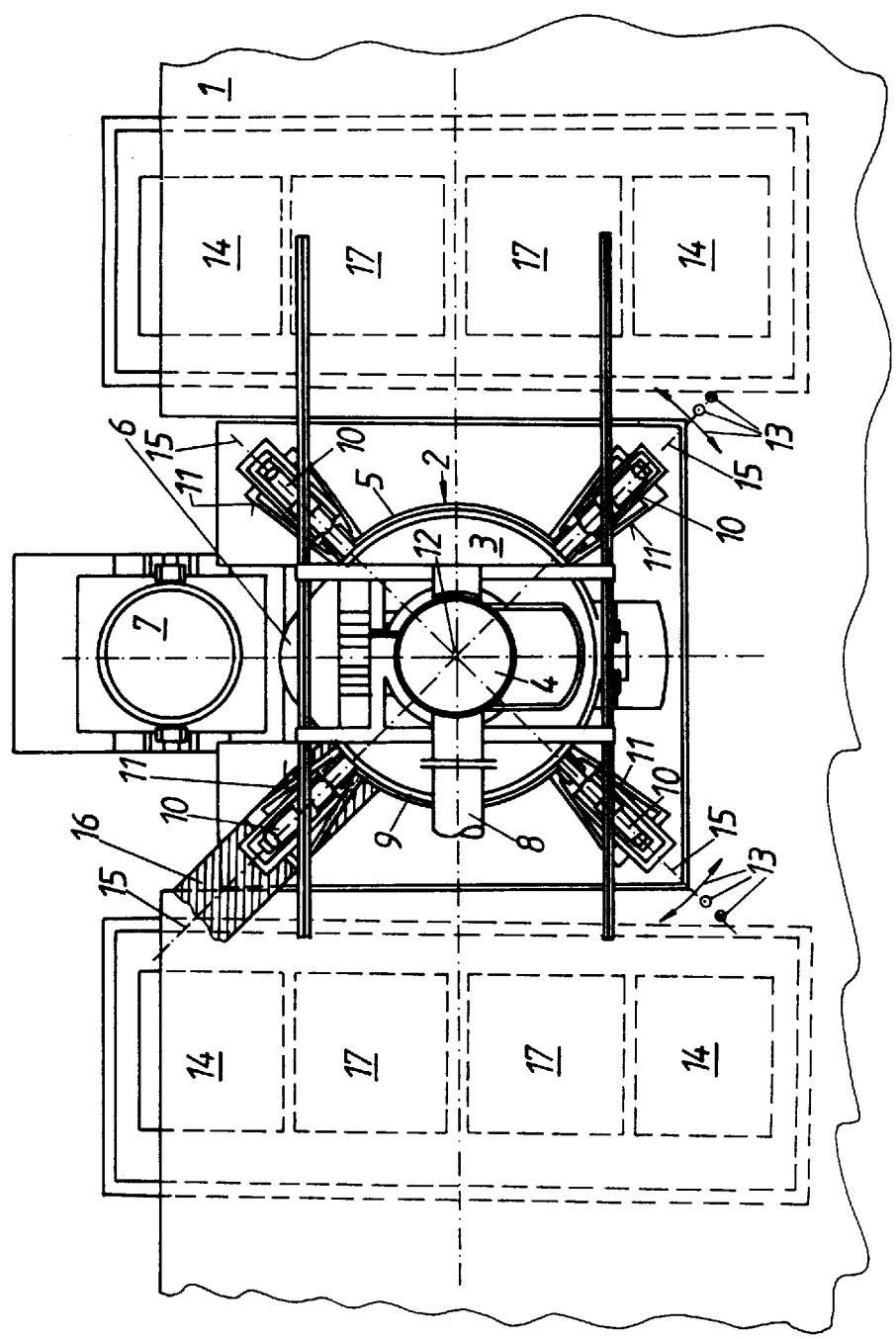

ELECTRODE ARRANGEMENT FOR DIRECT CURRENT AND FURNACE

BACKGROUND OF THE INVENTION

The invention relates to a d.c. arc furnace for metallurgical purposes comprising two or more electrodes arranged on the furnace vessel and projecting into the furnace vessel.

A d.c. arc furnace of this type is known, for instance, from U.S. Pat. No. 3,949,151. That furnace comprises three electrodes arranged in a radially symmetrical manner, viewed in the ground section of the furnace, wherein the electric supply means for feeding said electrodes are arranged to be concentrated on one side of the furnace. Each of the electrodes is supplied with current by a separate rectifier, the high current lines being conducted around the furnace to the respective electrodes to be fed, departing from the rectifier stations arranged on one side of the furnace.

The high current lines are surrounded by strong electric fields inducing electric-arc deflections of the electric arcs burning between the electrode tips and the metal melt. This results not only in a strongly non-uniform consumption of the electrodes, but also in a strongly thermal overload exerted on the brickwork of the furnace vessel. To avoid such phenomena, six anodes are provided in the bottom of the d.c. arc furnace according to U.S. Pat. No. 3,949,151, which anodes are connected with the electrodes projecting from top into the furnace via a separate switch mechanism. That known electrode arrangement and its special circuit is expensive in terms of construction and circuitry and, i.a., causes the furnace to function like an a.c. furnace.

SUMMARY OF THE INVENTION

The invention aims at avoiding these disadvantages and difficulties and has as its object to avoid, in a d.c. arc furnace of the initially defined kind comprising several electrodes, electric arc deflections brought about by the action of forces of the magnetic fields derived from the currents conducted to the electrodes. The electric arcs are to burn uniformly throughout the total period of operation of a furnace and in a direction that can be exactly predetermined in order to avoid thermal asymmetry within the d.c. arc furnace and hence elevated wear of the brickwork of the furnace vessel.

In accordance with the invention, this object is achieved in that the electric supply means provided for each of the electrodes are each arranged in the immediate vicinity of the electrode to be supplied, the electric supply means of one electrode being arranged so as to be spatially separated from the electric supply means of the remaining electrodes, viewed in the peripheral direction of the furnace vessel.

The arrangement of the electric supply means, such as rectifier throttles, etc., each in the immediate vicinity of the respective electrode minimizes the unilateral asymmetrical mutual influence of the electrodes the more so as in that case the high current lines directly lead to the supply means by a short way.

According to a preferred embodiment, the high current line conducted to one electrode—viewed in the ground section of the d.c. arc furnace—is arranged so as to extend in an approximately radial direction relative to the vertical central axis of the furnace as far as to a rectifier station associated with this electrode.

Preferably, the electrodes and the high current lines are arranged in an approximately radially symmetrical manner. Thereby, unilateral forces of the magnetic fields acting asymmetrically on the electric arcs of the electrodes may be completely avoided.

Suitably, each electrode is associated with a separate rectifier station, which—viewed in the ground section of the d.c. arc furnace—is each arranged in a region in the radial extension of the electrode.

To realize savings with the electric supply means, each electrode, according to a preferred embodiment, is associated with a separate rectifier station, at least two rectifier stations each being connected to a common transformer station.

In the following, the invention will be explained in more detail by way of an exemplary embodiment represented in the drawing, the drawing schematically illustrating a d.c. arc furnace in ground section.

BRIEF DESCRIPTION OF THE DRAWINGS

By 1 a furnace platform is denoted, in which a d.c. arc furnace 2 for the production of steel is inserted. This electric arc furnace 2 comprises a central charging shaft 4 vertically rising from the furnace lid 3 and reduced in its diameter relative to the diameter of the furnace vessel 5.

DESCRIPTION OF A PREFERRED EMBODIMENT

The furnace vessel 5 comprises an oriel 6, which in a conventional manner is provided with a bottom tap, through which the melt can flow into a ladle 7 placeable below the furnace vessel 5. A gas exhaust 8 is connected to the charging shaft 4.

Four graphite electrodes 10, which are each supported on electrode carrying means 11 by aid of which they are displaceable in the sense of their longitudinal axes and pivotable by a slight extent about the electrode tips or about the center 12 of the furnace, preferably both in the horizontal and in the vertical directions as indicated by the double arrows 13, project into the furnace vessel 5 in a direction inclined relative to the horizontal plane from aside, i.e., through the vertical side wall 9 of the same. Each of these electrodes 10 is associated with its own rectifier station 14, with which the electrode 10 is each connected via a high current line 15 and which is each arranged in the immediate vicinity of the electrode 10. Thus, it is feasible to connect the electrodes 10 with the rectifier stations 14 by short high current lines 15. The high current lines 15—viewed in ground section—each extend approximately in the extension of the electrodes 10. This applies, in particular, if the electrodes 10 are in the central position of their pivoting range.

As is apparent from the drawing, both the electrodes 10 and the high current lines 15—viewed in ground section—are arranged in a radially symmetrical manner. Slight deviations from the radially symmetrical arrangement of both the electrodes 10 and the high current lines 15 are permissible, resulting from the mere fact that the electrodes are pivotable in the horizontal direction. For instance, the arrangement of the high current lines 15 in the hatched region 16 would have no considerable influence on the electric arcs of the neighboring electrodes 10.

According to the exemplary embodiment represented in the drawing, each of the rectifier stations 14 is associated with a separate transformer station 17, both the rectifier stations 14 and the transformer stations 17 being arranged below the furnace platform 1 and hence on a level below the furnace vessel 5. Also a single transformer station 17 could serve to supply two adjacently arranged rectifier stations 14.

The invention is not limited to the exemplary embodiment illustrated in the drawing, but may be modified in various aspects. It is, for instance, possible to equip the d.c. arc furnace 2 also with three, six or eight electrodes 10. In such cases it is to be taken care that the high current lines 15—with the electrodes 10 arranged in a radially symmetrical manner—are conducted from the electrodes 10 to the respective rectifier stations 14 in an approximately radial direction—likewise seen in ground section. The invention also may be applied to d.c. arc furnaces comprising electrodes vertically projecting through the furnace lid 3.

We claim:

1. A d.c. arc furnace for metallurgical purposes comprising a furnace vessel having a vertical axis, a periphery around the axis and the periphery defining an interior of the vessel;

at least two electrodes arranged on the furnace vessel and projecting into the interior of the furnace vessel;

a respective electric supply provided for each of the electrodes, each supply comprising an electrical device and a high current line from the device to the electrode, each electrical device being arranged in the immediate vicinity of the respective electrode to be supplied by the device through the respective high current line, the electrical device for each electrode being arranged so as to be spatially separated from the electric devices of the electric supplies for the other electrodes around the periphery of the furnace vessel.

2. A d.c. arc furnace according to claim 1, wherein the high current line connected to each electrodes, viewed in a ground section of the d.c. arc furnaces, extends in an approximately radial direction relative to the vertical axis of the furnace to the respective electric device associated with the electrode.

3. A d.c. arc furnace according to claim 2, wherein the electrodes and the high current lines are arranged in an approximately radially symmetrical manner.

4. A d.c. arc furnace according to claim 2, wherein each electrode is associated with and connected by the respective high current line to a respective separate electrical device and viewed in the ground section of the d.c. arc furnace each device is arranged in a region that is a radial extension of the respective electrode.

5. A d.c. arc furnace according to claim 4, wherein each electrical device comprises a rectifier station for the respective electrode.

6. A d.c. arc furnace according to claim 3, wherein each electrode is associated with and connected by the respective high current line to a respective separate electrical device and, viewed in the ground section of the d.c. arc furnace, each electrical device is arranged in a region that is a radial extension of the respective electrode.

7. A d.c. arc furnace according to claim 6, wherein each electrode is associated with and connected by the respective high current line to the electrical device comprising a separate respective rectifier station;

a common transformer station for at least two of the rectifier stations for two of the electrodes.

8. A d.c. arc furnace according to claim 5, wherein each electrode is associated with and connected by the respective high current line to a separate respective rectifier station;

a common transformer station for at least two of the rectifier stations for two of the electrodes.

9. A d.c. arc furnace according to claim 2, wherein each electrical device comprises a rectifier station for the respective electrode.

10. A d.c. arc furnace according to claim 1, wherein each electrical device comprises a rectifier station for the respective electrode.

* * * * *